United States Patent
Holmstead et al.

(10) Patent No.: US 7,265,866 B2
(45) Date of Patent: Sep. 4, 2007

(54) CACHE MEMORY SYSTEM AND METHOD FOR PRINTERS

(75) Inventors: Stanley Bruce Holmstead, Middleton, ID (US); Jody L. Terrill, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 862 days.

(21) Appl. No.: 10/211,911

(22) Filed: Aug. 1, 2002

(65) Prior Publication Data

US 2004/0020389 A1 Feb. 5, 2004

(51) Int. Cl.
*G06F 15/00* (2006.01)
*G06K 1/00* (2006.01)

(52) U.S. Cl. .................. 358/1.16; 358/1.14; 358/1.15; 358/1.17; 358/1.18

(58) Field of Classification Search ...... 358/1.13–1.17, 358/1.9, 523, 524, 403, 423, 444; 711/113; 101/484
See application file for complete search history.

(56) References Cited

U.S. PATENT DOCUMENTS

| | | | |
|---|---|---|---|
| 5,428,747 A | | 6/1995 | Kitamoto |
| 5,920,854 A | * | 7/1999 | Kirsch et al. .................. 707/3 |
| 5,923,013 A | | 7/1999 | Suzuki et al. |
| 6,026,405 A | * | 2/2000 | Arda et al. .................... 707/10 |
| 6,061,715 A | * | 5/2000 | Hawes ........................ 709/203 |
| 6,341,304 B1 | | 1/2002 | Engbersen et al. |
| 6,559,958 B2 | * | 5/2003 | Motamed et al. ........... 358/1.13 |
| 6,662,270 B1 | * | 12/2003 | Sans et al. ................... 711/118 |
| 6,819,445 B1 | * | 11/2004 | Stevenson et al. ......... 358/1.15 |
| 2003/0204529 A1 | * | 10/2003 | Hertling et al. ............. 707/200 |

OTHER PUBLICATIONS

Adobe, Agfa, Heidelberg and Man Roland, "Job Definition Format (JFD) An Open Multi-Vendor Solution", Mar. 14, 2000, pp. 1 -8.*

* cited by examiner

*Primary Examiner*—David Moore
*Assistant Examiner*—James A. Thompson (57) ABSTRACT

A cache memory system and method for printers is described. In one exemplary implementation, a system includes a printer, memory, an input buffer and a control system. The memory contains one or more prior print job elements referenced by one or more previous print job tickets that were previously processed by the printer. The input buffer receives a new print job ticket referencing one or more new print job elements. The control system searches memory for any prior print job elements matching the one or more new print job elements referenced by the new print job ticket. The control system downloads one or more new print job elements not matching any of the one or more prior print job elements from a remote site. This permits the printer to retrieve the one or more prior print job elements that match the one or more new print job elements from memory instead of having to retrieve them from the remote site.

20 Claims, 9 Drawing Sheets

CACHE MEMORY SYSTEM AND METHOD FOR PRINTERS

TECHNICAL FIELD

The present invention relates generally to printing systems, and more specifically, to a cache memory system and method for printers.

BACKGROUND

Some printers receive print job requests in the form of a print job ticket. Most print job tickets contain information detailing how to process a document for printing. Often the print job ticket references a list of print job elements. Print job elements are components of a document such as photos, images, or some other item of page data. These components may be in the form of a file or some other form of data. Most references to print job elements provide some type of address indicating a location from where the print job elements may be retrieved, such as off a network, intranet and/or internet site. In order to process the print job ticket, a printer downloads the various print job elements from the various remote sites referenced by the ticket. Once all the print job elements are gathered, the printer is able to fully assemble the elements and print the document requested.

Printers, however, often experience substantial delays when downloading print job elements from remote sites. In some cases, the delays are caused by a lack of bandwidth between the printer and remote sites. The bandwidth is reduced by the size and/or the frequency of the print job elements accessed from remote sites as well as other multiple users making multiple requests and transactions concurrently with the printer while using the same network. Ultimately, the delay associated with downloading print job elements from remote sites can slow down the speed of printers.

SUMMARY

A cache memory system and method for printers is described. In one exemplary implementation, a system includes a printer, memory, an input buffer and a control system. The memory contains one or more prior print job elements referenced by one or more previous print job tickets that were previously processed by the printer. The input buffer receives a new print job ticket referencing one or more new print job elements. The control system searches memory for any prior print job elements matching the one or more new print job elements referenced by the new print job ticket. The control system downloads one or more new print job elements not matching any of the one or more prior print job elements from a remote site. This permits the printer to retrieve the one or more prior print job elements that match the one or more new print job elements from memory instead of having to retrieve them from the remote site.

BRIEF DESCRIPTION OF THE DRAWINGS

The detailed description is described with reference to the accompanying figures. In the figures, the left-most digit(s) of a reference number identifies the figure in which the reference number first appears.

DETAILED DESCRIPTION

The following description, introduces the broad concept of increasing the speed of a printer by retaining print job elements in local memory of the printer for a period of time beyond completion of a print job request in which the print job elements were referenced. When a print job ticket is received by the printer, rather than automatically downloading the print job elements referenced by the print job ticket from remote sites, the local memory is searched, first, to determine whether any of the print job elements referenced by the print job ticket may already reside in local memory. If any of the print job elements already reside in local memory, the printer is relieved of retrieving them from a remote site.

Exemplary Printer Architecture

Figure 1:
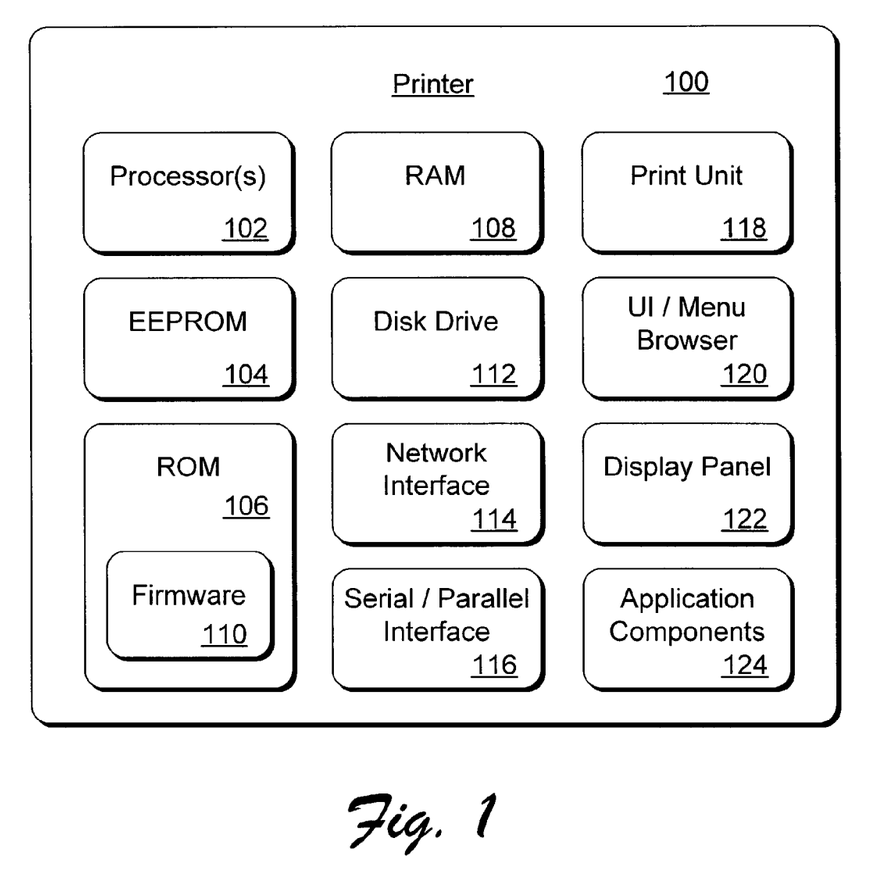
FIG. 1 illustrates various components of an exemplary printer that can be utilized to implement the inventive techniques described herein.

FIG. 1 illustrates various components of an exemplary printer 100 that can be utilized to implement the inventive techniques described herein. Printer 100 includes one or more processors 102, an electrically erasable programmable read-only memory (EEPROM) 104, ROM 106 (non-erasable), and a random access memory (RAM) 108. Although printer 100 is illustrated having an EEPROM 104 and ROM 106, a particular printer may only include one of the memory components as well as mass storage in the form of a disk drive 112. Additionally, although not shown, a system bus typically connects the various components within printer 100.

Printer 100 may include a firmware component 110 that is implemented as a permanent memory module stored on ROM 106. Firmware 110 is programmed and tested like software, and is distributed with printer 100. Firmware 110 can be implemented to coordinate operations of the hardware within printer 100 and contains programming constructs used to perform such operations.

Processor(s) 102 process various instructions to control the operation of the printer 100 and to communicate with other electronic and computing devices. The memory components, EEPROM 104, ROM 106, and RAM 108, store various information and/or data such as configuration information, fonts, templates, data being printed, and menu structure information. Although not shown, a particular printer can also include a flash memory device in place of or in addition to EEPROM 104 and ROM 106.

Printer 100 also includes disk drive 112 (or some other form of mass storage), a network interface 114, and a serial/parallel interface 116. Disk drive 112 provides additional storage for data being printed or other information maintained by printer 100. Although printer 100 is illustrated having both RAM 108 and a disk drive 112, a particular printer may include either RAM 108 or disk drive 112, depending on the storage needs of the printer. For example, an inexpensive printer may include a small amount of RAM 108 and no disk drive 112, thereby reducing the manufacturing cost of the printer.

Network interface 114 provides a connection between printer 100 and a data communication network. Network interface 114 allows devices coupled to a common data communication network to send print jobs, menu data, and other information to printer 100 via the network. Similarly, serial/parallel interface 116 provides a data communication path directly between printer 100 and another electronic or computing device. Although printer 100 is illustrated having a network interface 114 and serial/parallel interface 116, a particular printer may only include one interface component.

Printer 100 also includes a print unit 118 that includes mechanisms arranged to selectively apply an imaging medium such as liquid ink, toner, and the like to a print media in accordance with print data corresponding to a print job. Print media can include any form of media used for printing such as paper, plastic, fabric, Mylar, transparencies, and the like, and different sizes and types such as 8½×11, A4, roll feed media, etc. For example, print unit 118 can include an inkjet printing mechanism that selectively causes ink to be applied to a print media in a controlled fashion. The ink on the print media can then be more permanently fixed to the print media, for example, by selectively applying conductive or radiant thermal energy to the ink. Those skilled in the art will recognize that there are many different types of print units available, and that for the purposes of this discussion, print unit 118 can include any of these different types.

Printer 100 also includes a user interface and menu browser 120, and a display panel 122. The user interface and menu browser 120 allows a user of the printer 100 to navigate the printer's menu structure. User interface 120 can be indicators or a series of buttons, switches, or other selectable controls that are manipulated by a user of the printer. Display panel 122 is a graphical display that provides information regarding the status of printer 100 and the current options available to a user through the menu structure.

Printer 100 can include application components 124 that provide a runtime environment in which software applications or applets can run or execute. Those skilled in the art will recognize that there are many different types of runtime environments available. A runtime environment facilitates the extensibility of printer 100 by allowing various interfaces to be defined that, in turn, allow the application components 124 to interact with the printer.

General reference is made herein to one or more printing devices, such as printer 100. As used herein, "printer" means any electronic device having data communications, data storage capabilities, and/or functions to render printed characters and images on a print media. A printer may be a fax machine, copier, plotter, and includes any type of printing device using a transferred imaging medium, such as ejected ink, to create an image on a print media. Examples of such a printer can include, but are not limited to, laser printers, inkjet printers, plotters, portable printing devices, as well as multifunction combination devices. Although specific examples may refer to one or more of these printers, such examples are not meant to limit the scope of the claims or the description, but are meant to provide a specific understanding of the described implementations.

It is to be appreciated that additional components (not shown) can be included in printer 100 and some components illustrated in printer 100 above need not be included. For example, additional processors or storage devices, additional I/O interfaces, and so forth may be included in printer 100, or disk drive 112 may not be included.

It is also to be appreciated that the components and processes described herein can be implemented in software, firmware, hardware, or combinations thereof. By way of example, a programmable logic device (PLD) or application specific integrated circuit (ASIC) could be configured or designed to implement various components and/or processes discussed herein.

Exemplary Network Environment

Figure 2:
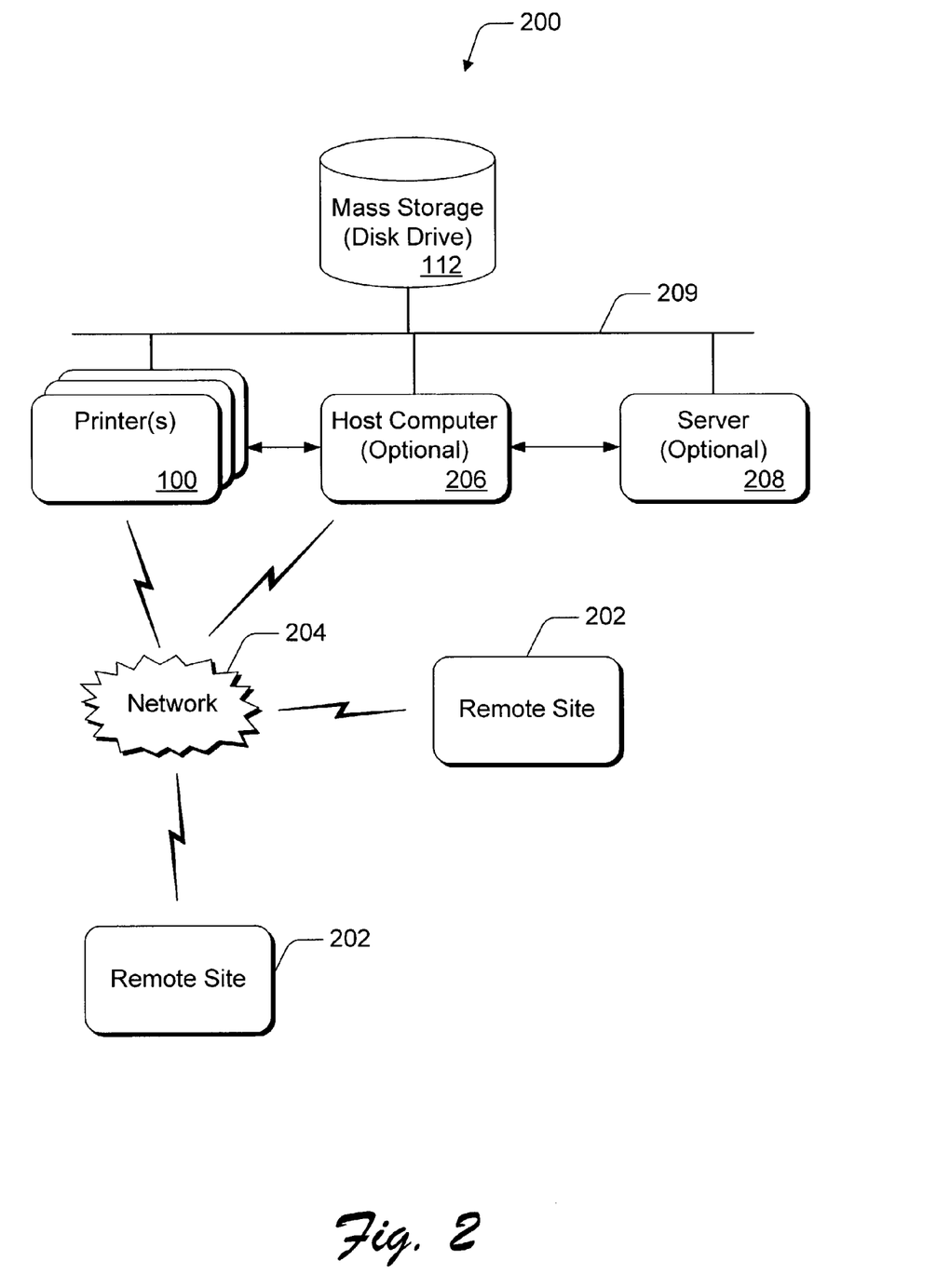
FIG. 2 illustrates an exemplary environment in which a printer typically communicates and retrieves documents from one or more remote sites.

FIG. 2 illustrates an exemplary environment 200 in which one or more printers 100 communicate and retrieve documents from one or more remote sites 202. Each printer 100 can include one or more of the components of the exemplary printing device 100 (FIG. 1). Typically, a network 204 links the printer(s) 100 to the remote sites 202. The network 204 can be any type of network, such as a local area network (LAN) or a wide area network (WAN), using any type of network topology and any network communication protocol. The network 204 used to couple printer(s) 100 to remote sites 202 can be any of a wide variety of conventional network topologies and types (including wired and/or wireless networks), employing any of a wide variety of conventional network protocols (including public and/or proprietary protocols). In one implementation, the network used to couple printer 100 to remote sites 202 includes the Internet (and may include one or more LANs), allowing printer 100 to communicate via TCP/IP (Transmission Control Protocol/Internet Protocol) and HTTP (HyperText Transport Protocol).

Although only a few devices are shown interconnected via network 204, a typical network can have any number of devices connected to it, either directly or indirectly via another network system. The internet is an example of multiple connected network systems each having multiple devices. A printer 100, or through a host computer 206 (such as a computer or other processing device) can also have a modems and/or a network card that facilitates network communication and data transfer via the network 204.

Additionally, printer(s) 100 can be connected to the remote sites 202 via a host computer 206 optionally coupled to printer(s) 100 directly (e.g., via a parallel port connection, a Universal Serial Bus (USB) connection, a firewire connection, etc.), or indirectly (e.g., via a network, such as a local area network (LAN)). Additionally, optional servers 208 can be coupled to host computer 206 or printer 100, via network 204, or alternatively coupled directly to host computer 206 or printer 100. Furthermore, mass storage, such as a disk drive 112, may be an independent component coupled directly or indirectly to the network 204, host computer 206, printer(s) 100 and/or optional server 208. In the exemplary illustration, mass storage 112 is connected to the printer(s) 100, host computer 206, and/or optional server 208 via a bus 209. Host computer 206 can be any of a wide variety of conventional computing devices, including a desktop PC, a workstation, etc. For purposes of describing the exemplary implementations herein, reference will only be made to printer 100. However, it is appreciated that some components used to store data as well as functionality described herein could be alternatively implemented in one or more host computers 206 coupled to printer 100 or as a combination of one or more host computers 206 and one or more printers 100.

Cache Memory System

Figure 3:
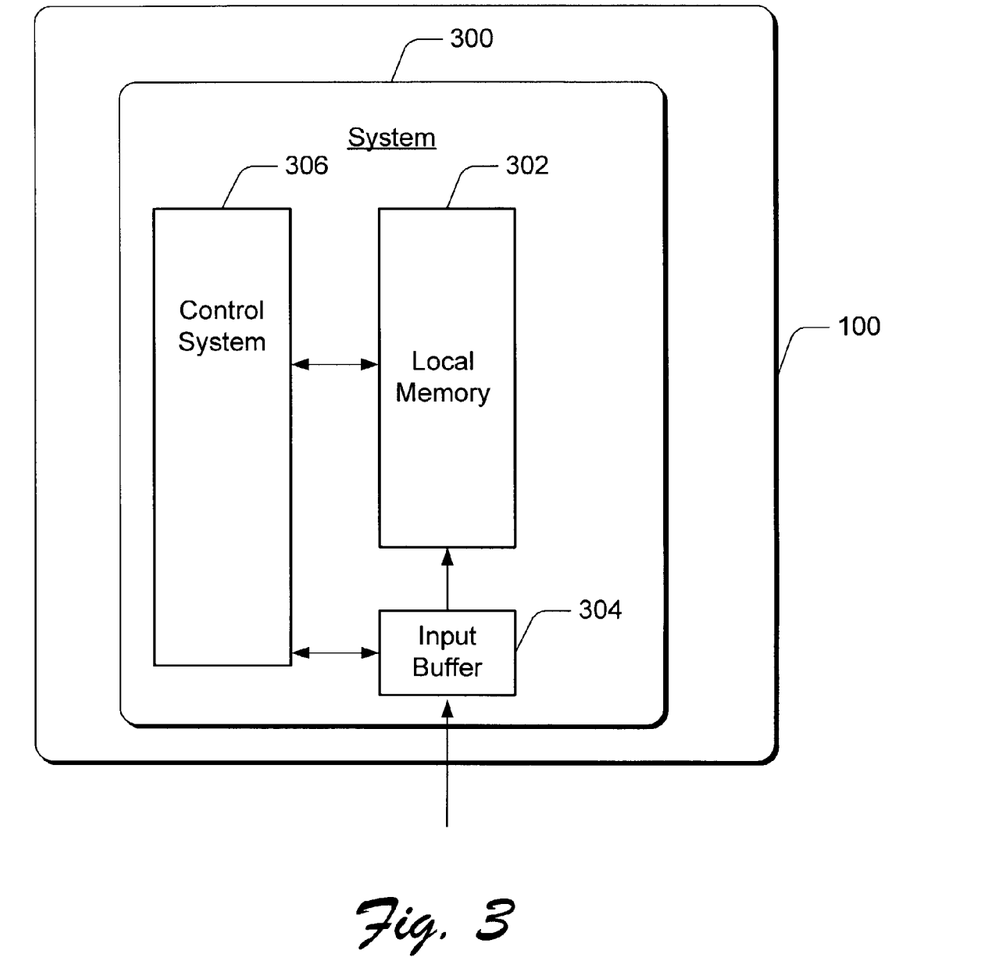
FIG. 3 illustrates a system that enables more efficient use of available bandwidth for downloading data to a printer.

FIG. 3 illustrates a system 300 that enables more efficient use of available bandwidth for downloading data to printer 100 (see FIG. 1). System 300 includes a local memory (cache memory system) 302, an input buffer 304, and a control system 306. All components of system 300 can be implemented in printer 100, or as part of a host computer 206 in association with printer 100 as described above. For purposes of discussion, however, system 300 is shown to be part of printer 100.

Local memory 302 may include any of the memory components, EEPROM 104, ROM 106, RAM 108 and/or disk drive 112 described with reference to FIG. 1. Usually, local memory 302 consists of data that can be retrieved by processor(s) 102 without having to use a network interface 114 before accessing the data. Therefore, data stored in local memory 302 is accessible much more quickly than having to retrieve data from a remote site 202. As shall be explained, the local memory 302 serves as cache for printer 100, because printer 100 may search local memory 302 for recently retained data needed for a particular print job request instead of automatically retrieving the data from a remote site 202.

Input buffer 304 is a memory device used to temporarily store data when the data is initially received by printer 100 via network interface 114. In most cases, the memory device used for input buffer 304 is in the form of RAM 108.

Control system 306 decides when to retrieve data from remote sites 202 or from local memory 302. Control system 306 may include one or more processor(s) 102, such as a general purpose processor or one or more dedicated microcontrollers (e.g., one or more ASICs or PLDs). Also included in control system 306 is computer executable instructions (in the form of logic or computer code) stored on one or more computer-readable media, such as ROM 106 and/or as firmware 110 shown in FIG. 1.

Figure 4:
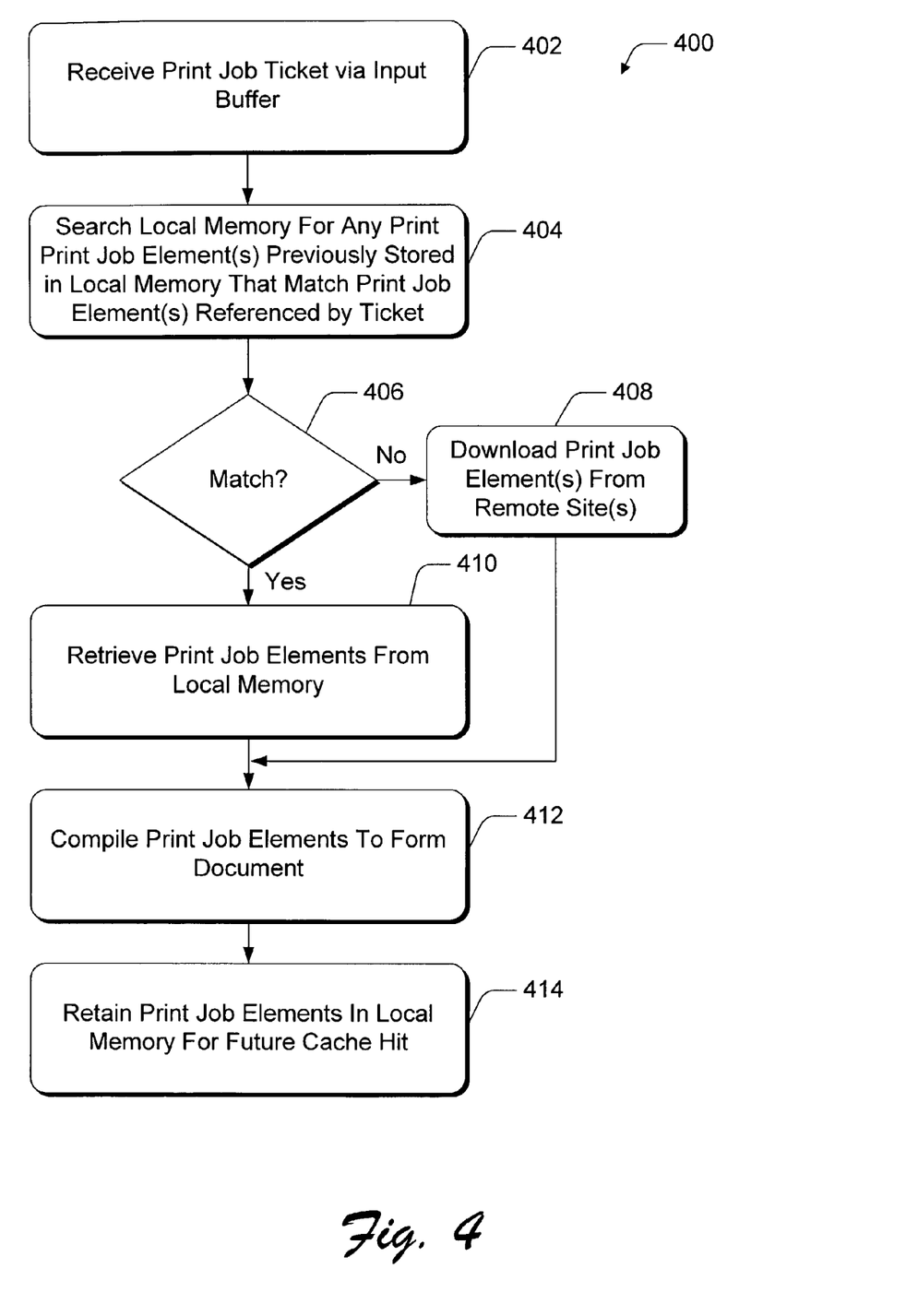
FIG. 4 illustrates a method showing the operation of the system shown in FIG. 3.

FIG. 4 is a method 400 showing the operation of system 300. The order in which the method 400 is described is not intended to be construed as a limitation. Furthermore, the method 400 can be implemented in any suitable hardware, software, firmware, or combination thereof.

Figure 5:
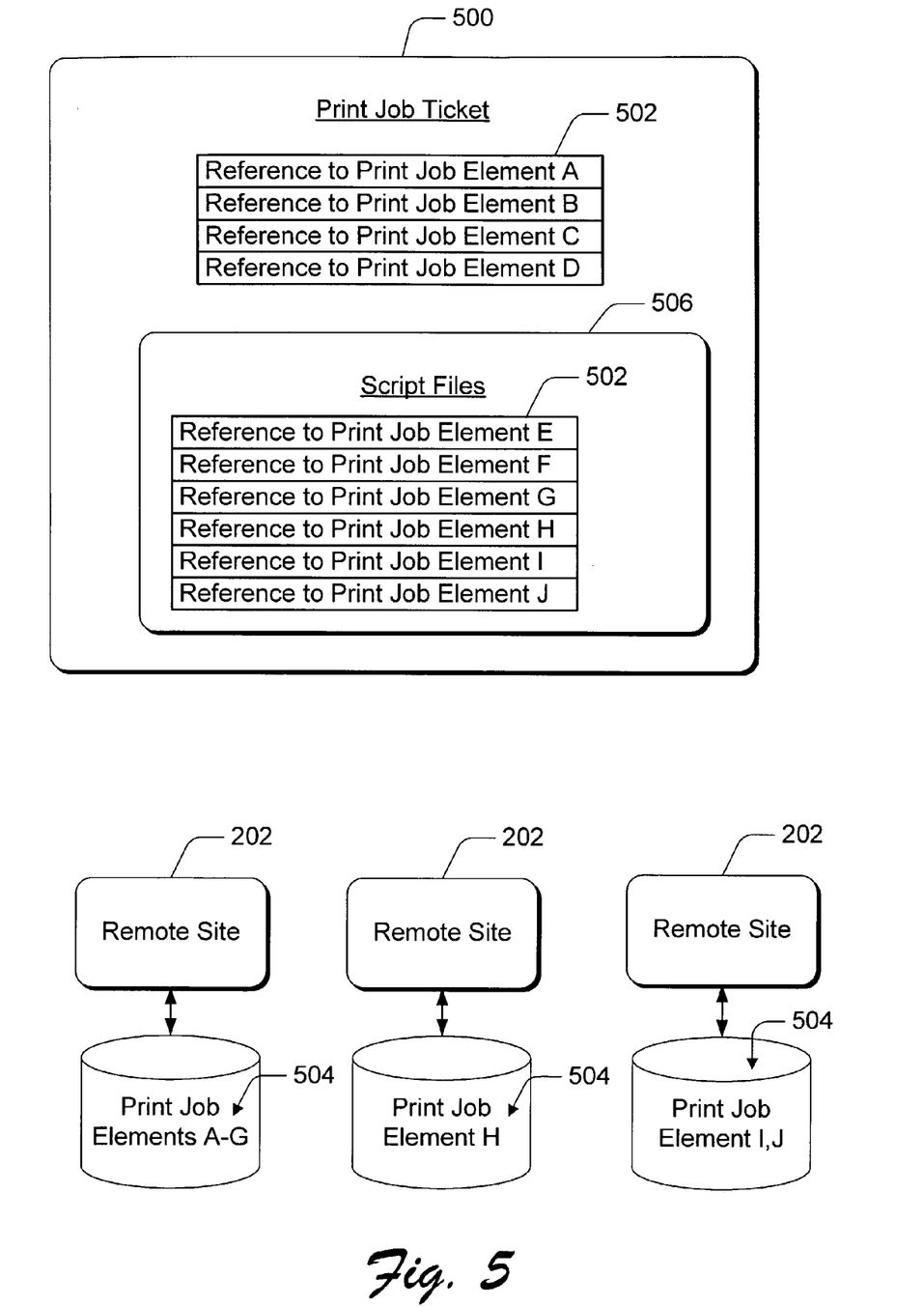
FIG. 5 shows a representative print job ticket as well as remote sites in which the data and metadata associated with print job elements that are referenced by the print job ticket may reside.

At a block 402, printer 100 receives a print job ticket and stores the print job ticket temporarily in input buffer 304 (see FIG. 3). FIG. 5 shows a representative print job ticket 500 as well as remote sites 202 in which the data and metadata associated with print job elements 504 that are referenced by the print job ticket 500 may reside. In the exemplary illustration, print job ticket 500 is a print job request formatted in a Job Definition Format (JDF). JDF is an XML-based file format industry standard released by the CIP4™ Organization of Switzerland. Alternatively, the print job ticket could be formatted in other protocols such as Print Production Format (PPF), Portable Job Ticket Format from Adobe® Systems and so forth.

Print job ticket 500 includes references 502 (References A-J) to one or more print job elements 504. Print job elements 504 are components of a document such as photos, text, images, or some other item of page data. Each print job element 504 referenced by the print job ticket 500 (via a script file 506 or the ticket 500 directly) generally includes a remote site address indicating a location (e.g. a remote site 202) where to obtain the print job elements 504. A remote site may be specified in any variety of protocols such as HTTP (HyperText Transfer Protocal), HTTPS (Secure HTTP), FTP (File Transfer Protocol), native OS file transfer, etc.

Referring back to FIG. 4, at block 404, control system 306 searches the local memory 302 for any prior print job elements previously stored in local memory 302 matching the one or more print job elements 504 referenced by the references 502 in print job ticket 500.

At a block 406, if there are any print job elements 504 referenced (e.g., References A-J) by the references 502 in print job ticket 500 that are not present in local memory 302, then at a block 408, control system 306 has the printer 100 download (i.e., gather or collect) such print job elements 504 from one or more remote sites 202. In other words, if any print job elements 504 are not present in local memory 302, then control system 306 treats the event as a cache miss and retrieves the elements from one or more remote sites 202.

On the other hand, if there are one or more print job elements already in local memory 302, then at a block 410, printer 100 is able to retrieve the one or more print job elements from local memory 302 instead of downloading them from a remote site(s) 202. In other words, if any print job elements 504 are present in local memory 302, then control system 306 treats the event as a cache hit and retrieves the one or more print job elements 504 from local memory 302.

At a block 412, printer 100 compiles all the print job elements 504 to form a print ready document. The print job elements 504 are compiled once the data associated with the print job elements 504 referenced by the print job ticket 500 are downloaded from remote site(s) 202 or are already present in local memory 302 as a result of a previous print job ticket.

At a block 414, after producing a print ready document, printer 100 retains the print job elements (i.e., the assets/contents/data of a document) in local memory 302 for possible later retrieval in the event a future print job ticket references any of the one or more retained print job elements. These retained print job elements are therefore stored in local memory 302 after the print job ticket 500 has been processed by the printer 100.

Managing Printable Assets

Figure 6:
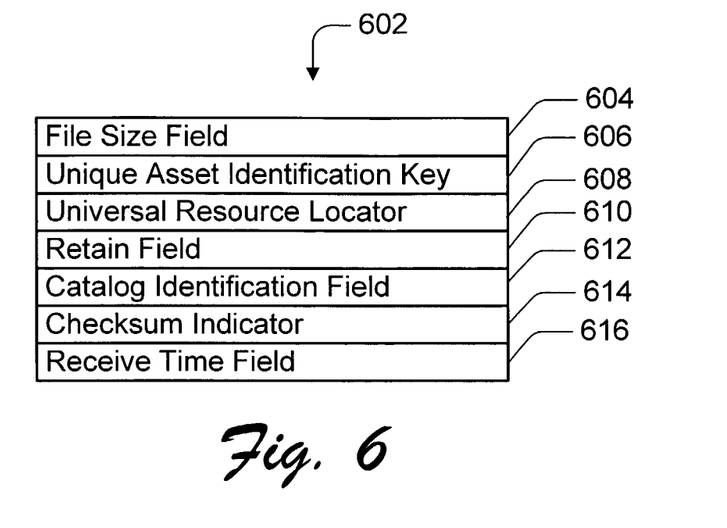
FIG. 6 shows metadata (also referred to as file attributes) of a print job element that may be referenced by a print job ticket or by a script file embedded within a print job ticket as shown in FIG. 5.

FIG. 6 shows attributes 602 (in the form of metadata) associated with a print job element 504 that may be referenced by a print job ticket or by a script file 506 embedded within a print job ticket 500. In the exemplary illustration, the attributes 602 are part of a JDF run list, but may be included as part of any type of print job request file that specifies information on where to gather print job elements 504 and possibly how the print job elements are to be merged into a document.

For example, attributes 602 includes a file size field 604, a unique asset identification key 606, a Universal Resource Locator 608, a retain field 610, a catalog identification field 612, a checksum indicator 614, and received time field 616.

File size field 604 provides an indication of the size of a particular print job element. Unique asset identification key 606 provides a unique identification number for a particular attribute 602. Universal Resource Locator 608 provides the location in which a print job element referenced by the attribute 602 is located. As mentioned above, downloading of print job assets can use a variety of protocols such as HTTP (HyperText Transfer Protocol), HTTPS(Secure HTTP), FTP (File Transfer Protocol), or native OS file transfer mechanisms as specified by the URL referenced in the print job ticket 500. Retain field 610 provides information on how long to retain a particular print job element referenced by the script file in local memory 302. The catalog identification field 612 is a unique identification number identifying a particular customer. Checksum indicator 614 provides a basis to perform security and integrity checks between script files received and print job elements downloaded from remote sites that may be referenced by a particular attribute 602. For example, the MD5 algorithm indicator can be used together with the file size field 604 to ensure receipt of secure and valid print job elements. Finally, receive time field 616 indicates the time a print job element is stored in local memory 302.

It is to be appreciated that additional information (not shown) can be included in an attribute 602 and some information illustrated in an attribute 602, may not need to be included. For example, additional information in the form of a Multipurpose Internet Mail Extension type (e.g. Portable Document Format, PostScript, etc.) may be included in file 602, or the catalog identification field 612 may not be included.

Figure 7:
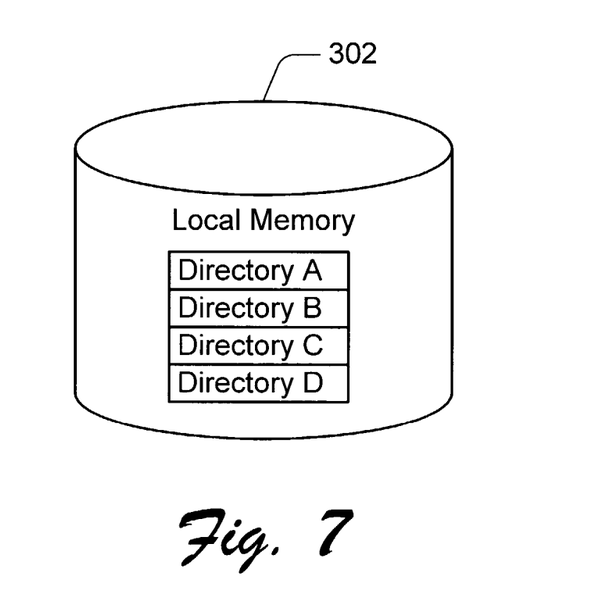
FIG. 7 illustrates a local memory segmented into separate directories.

FIG. 7 illustrates a local memory 302 segmented into separate directories A-D. Each directory A-D corresponds to customers A-D, respectively. Accordingly, control system 306 is able to search a particular directory A-D, instead of the entire local memory 306, each time a print job ticket 500 is received to determine if a print job element 504 referenced by the ticket already exists in local memory 302 and therefore does not need to downloaded from a remote site 202. The catalog identification field 612 provides an indication in the attribute 602 of which customer (A, B, C, or D) the print job element is associated. Segmenting the local memory as described reduces search times and retrieval rates of data contained in local memory 302. Additionally, the separate directories in local memory 302 aids when merging print job elements from local memory 302.

Furthermore, each directory in local memory 302 can be treated differently depending on a particular customer. For example, information stored in directory A can be overwritten (and/or erased) every thirty days, because customer A may print completely different materials every thirty days. Whereas, customer B may send very similar print job elements over an extended period of time, therefore, information stored in directory B may be stored indefinitely, so long as there is free memory space available in directory B.

Figure 8:
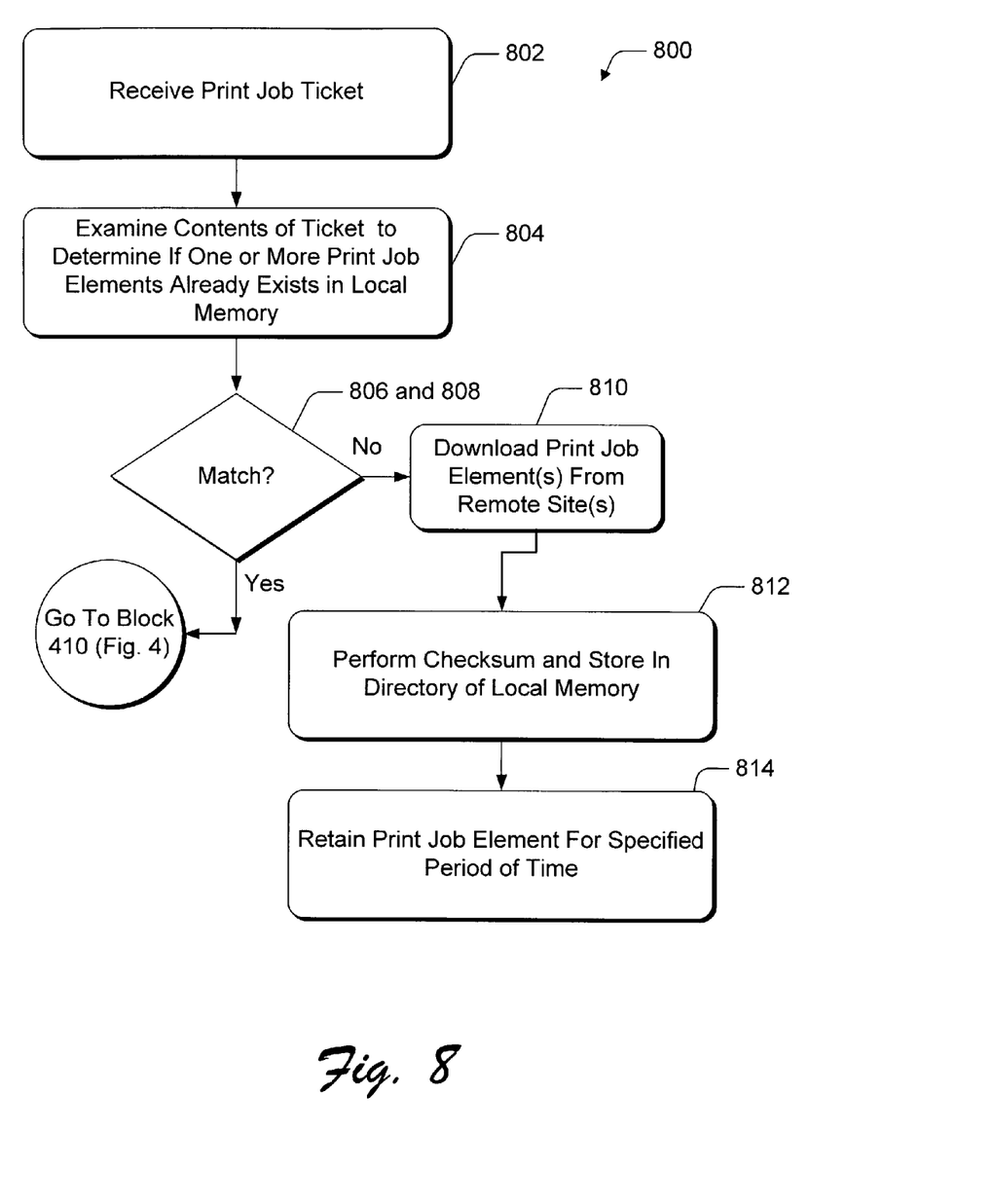
FIG. 8 is a flow chart illustrating a methodology of how to efficiently manage print job elements.

FIG. 8 is a flow chart illustrating a method 800 showing how to efficiently manage print job elements referenced by a print job ticket. The order in which the method is described is not intended to be construed as a limitation. Furthermore, the method 800 can be implemented in any suitable hardware, software, firmware, or combination thereof.

At a block 802, the input buffer 304 receives a print job ticket 500. The print job ticket 500 includes one or more files, such as the sample attributes 602 shown in FIG. 6, which contains information that enables generation of a printable document.

At a block 804, control system 306 examines the contents of the attributes 602 to determine if one or more print job elements referenced by the file already exists in local memory 302. The control system 306 searches local memory 302 for a print job element having unique asset identification key 606 that matches the unique asset identification key 606 referenced by the attributes 602. The control system 306 searches a particular directory (e.g. A, B, C, or D) based on the catalog identification field 612.

If at a block 806 matching unique asset identification keys 606 are located, then at a block 808 control system 306 further compares the attributes 602 to the print job element 504 stored in local memory 302 to determine if a newer or otherwise modified print job element is referenced by the attributes 602. In other words, a determination is made to ascertain whether a print job element 504 previously stored in local memory 302 has been updated by a modified version of the print job element 504. Portions of the attributes 602, such as the file size field 604 and checksum indicator 614, can used to ensure that the print job element referenced by the ticket, completely matches a previously stored print job element in local memory 302.

At a block 810, if the print job element referenced by the ticket does not match the print job element stored in local memory 302, or if no print job element referenced by the file exists in local memory 302, then the control system 306 uses the URL 608 as basis for printer 100 to download the print job element 504 from a remote site 202.

At a block 812, once the print job element 504 is retrieved from the remote site 202, a check sum is performed to determine that the print job element 504 received from the remote site is the correct version. Assuming the print job element has been downloaded correctly, the print job element 504 is stored in local memory 302. That is, control system 302 stores the print job element 504 (as well as attributes or metadata about the print job element 504 in a segment (A, B, C or D see FIG. 7) of the local memory 302 corresponding to a particular customer indicated by the catalog identification field 612.

At a block 814 control system 306 stores the print job element 504 in local memory 302 for a specified period of time indicated by the retain field 610. In the exemplary implementation, the control system 306 can ignore the retain field, if the requested period violates a parameter. For instance, local memory 302 may be full or close to reaching maximum capacity and therefore control system 306 may ignore the request to retain particular data.

Scheduled Downloading of Data for a Printer

Figure 9:
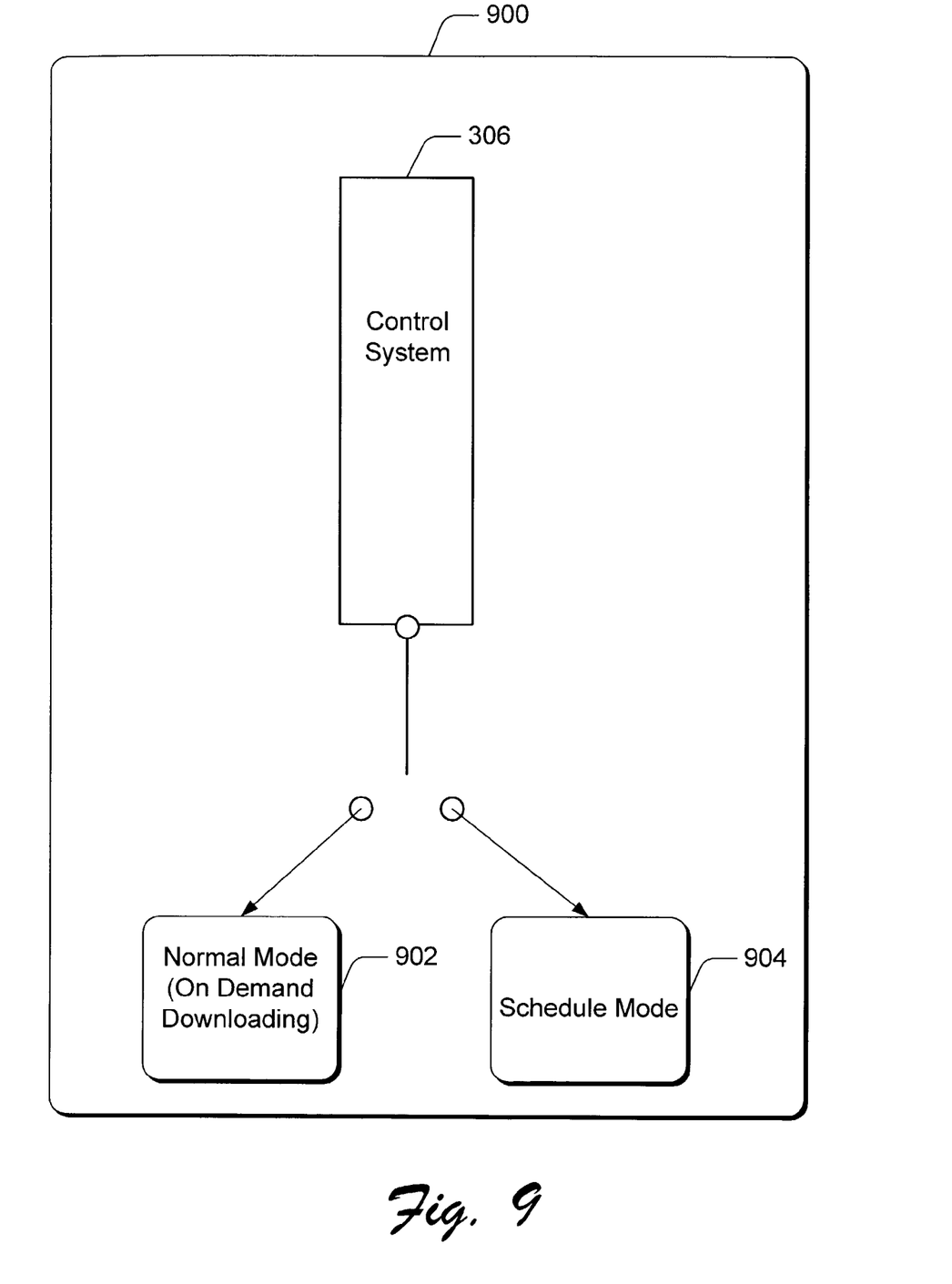
FIG. 9 is a block diagram of a printer having a selectable normal mode and a selectable schedule mode for downloading documents from remote sites.

FIG. 9 is a block diagram of a printer 900 having a normal mode 902 and a schedule mode 904 for downloading documents from remote sites. Printer 900 is identical to printer 100 (see FIG. 1), but the control system 306 is operable in a selectable one of: a normal mode 902 in which contents of a print job are downloaded from a remote site 202 on-demand; and a schedule mode 904 in which contents of the printable document are downloaded from the remote site 202 at a scheduled time.

When control system 306 is in the normal mode 902, contents needed to complete a print job are downloaded from a remote site 202. While in the normal mode 902, print job elements (or assets) can be downloaded at peak times when bandwidth of network resources may be reduced. It is possible, however, that download requests made by the printer during peak times may quickly exhaust all available bandwidth between the printer 900 and the remote sites 202 such as shown in FIG. 2.

Accordingly, a user may desire to select the schedule mode 904 instead of the normal mode 902 in certain instances to reduce the bandwidth requirements during peak network usage times. Accordingly, the user can select an off-peak time when data bandwidth over a network connecting the printer to one or more remote sites is higher than during other times when there is lower data bandwidth availability over the network. For instance, in the schedule mode 904, the user may select to schedule the downloading of print job elements exceeding a certain threshold size between midnight and 6:00 AM.

Of course, other times could be selected depending on the system. For example, based on the customer (via catalog identification field 612), print job elements 504 can be downloaded on a high priority basis for a preferred customer or scheduled at a later time on a lower priority basis for a lower priority customer.

A graphical user interface 114 (see FIG. 1) of commands sent to control system 306 via a host device, permits a user to select between the normal mode 902 and the schedule mode 904. Alternatively, a switch (not shown) or button (not shown) on the printer 900 could be used to select between the normal mode 902 and schedule mode 904.

Alternatively, it is possible for the control system 306 to automatically monitor the bandwidth demands needed by the printer 900 as compared to actual bandwidth availability to printer 900. If the control system 306 determines there is sufficient bandwidth to download the requested data (print job elements), then printer 900 is able to download the elements in the normal mode 902 (on-demand). If at a given time, is determined that the network 204 is too busy transferring information and that requested print job elements will take too much time to be delivered, then control system 306 is configured to select the schedule mode 904. Control system 306 will then store the requests to download the print job elements and execute the requests at a later time when the available bandwidth is above a certain threshold level.

Alternatively, a user can select a threshold size of an asset that must be downloaded in the schedule mode. Thus, if an asset (print job element) exceeds a threshold size, control system 306 automatically schedules the asset to be downloaded at another time (e.g., off-peak time).

Control system 306 having a normal mode 902 and schedule mode 904 reduces content that must be transported over networks. Depending on the amount of bandwidth or demand connection to the internet, scheduling the downloading of assets for printable documents during off-peak times may be beneficial to the performance of the printer. Accordingly, print job elements (assets) that may consume all of the available bandwidth may be scheduled for later times. This permits printer 900 to process other print jobs that do not have such high bandwidth requirements.

Figure 10:
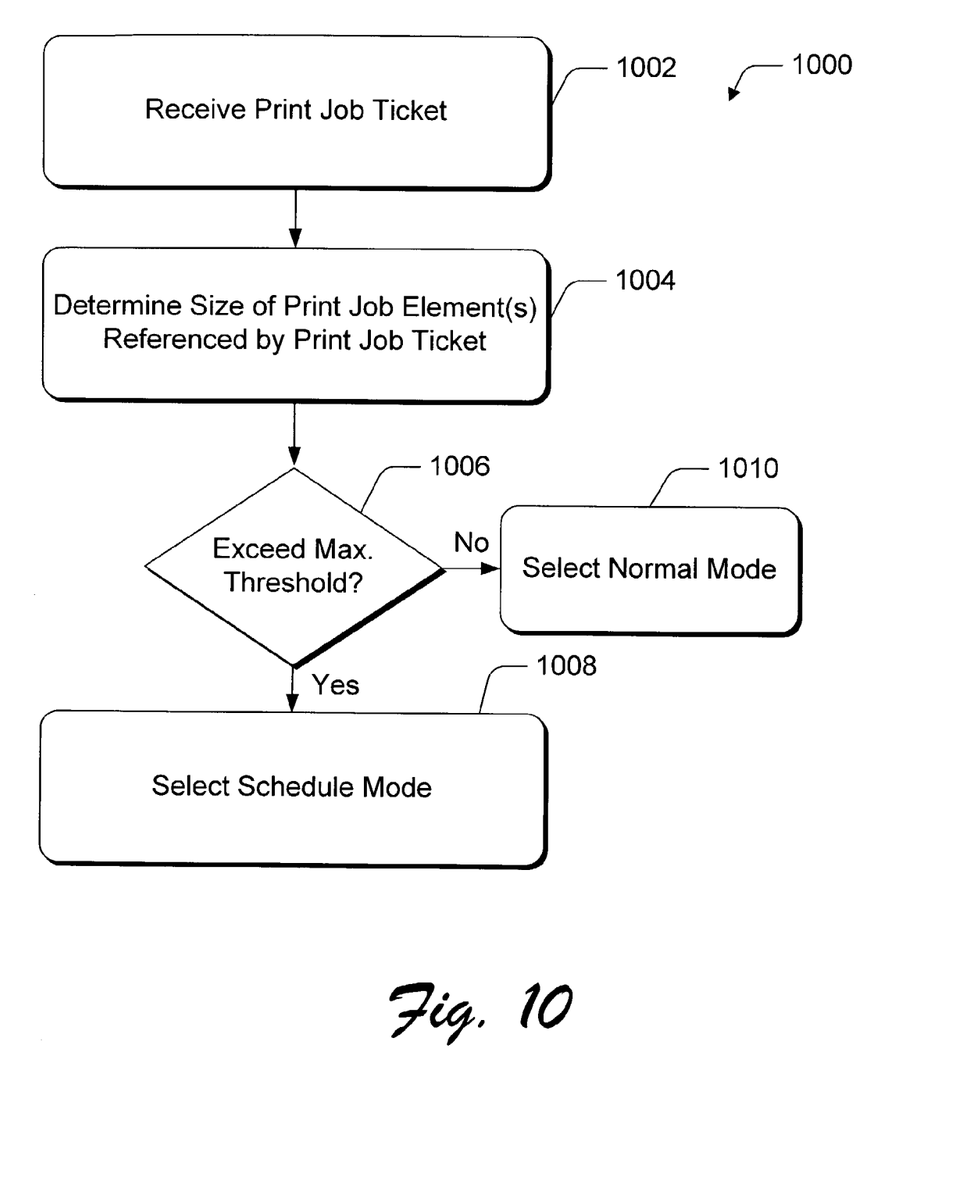
FIG. 10 is a flow chart illustrating a method for scheduling retrieval of printable assets from remote sites.

FIG. 10 is a flow chart illustrating an exemplary method 1000 for downloading print job elements on-demand or according to a schedule. The order in which the method is described is not intended to be construed as a limitation. Furthermore, the method 1000 can be implemented in any suitable hardware, software, firmware, or combination thereof.

At a block 1002, printer 900 receives a print job ticket 500 referencing one or more print job elements 504.

At a block 1004, control system 306 determines the size of the print job elements referenced by the print job ticket 500. If at a block 1006, any print job elements associated with the print job ticket exceed a maximum threshold size, then according to block 1008, the control system selects the schedule mode 904 and such print job elements (those that exceed the threshold) are scheduled for retrieval from one or more remotes sites 202 at a later time.

On the other hand, there are print job elements referenced by the ticket that do not exceed the maximum threshold size, then according to block 1010 the control system selects the normal mode 902 and such print job elements (those that do not exceed the maximum threshold size) can be downloaded from remote sites 202 as they are needed by the printer 900.

Although some implementations of the various methods and arrangements of the present invention have been illustrated in the accompanying Drawings and described in the foregoing Detailed Description, it will be understood that the invention is not limited to the exemplary aspects disclosed, but is capable of numerous rearrangements, modifications and substitutions without departing from the spirit of the invention as set forth and defined by the following claims.

What is claimed is:

1. A system, comprising:
   a printer;
   a memory in the printer containing one or more prior print job elements referenced by one or more previous print job tickets processed by the printer, wherein each of the prior print job elements is retained in the memory for a corresponding amount of time specified by a corresponding one of the previous print job tickets;
   an input buffer configured to receive a new print job ticket referencing one or more new print job elements; and
   a control system configured to process the received new print job ticket so as to (i) search the memory for any prior print job elements matching the one or more new print job elements, and (ii) download the one or more new print job elements not matching any of the one or more prior print job elements from at least one remote site, the remote site responsive to a download request from the control system.

2. The system as recited in claim 1, wherein the control system is further configured to retain one or more of the new print job elements referenced by the new print job ticket in the memory for a corresponding amount of time specified by the new print job ticket after completion of a print job request represented by the new print job ticket.

3. The system as recited in claim 2, wherein the retained one or more of the new print job elements is all the new print job elements.

4. The system as recited in claim 1, wherein each of the one or more print job elements is an image in a printable document.

5. The system as recited in claim 1, wherein the new print job ticket is received from a source that is different from at least one of the remote sites.

6. The system as recited in claim 1, wherein the control system is disposed in the printer and is further configured to operate in a normal mode in which the one or more new print job elements are downloaded to the printer on-demand or in a schedule mode in which the one or more new print job elements are downloaded to the printer at a scheduled time.

7. The system as recited in claim 6, wherein the control system is operated in the schedule mode to download print job elements that exceed a certain threshold size.

8. The system as recited in claim 6, wherein the control system is operated in the normal mode to download print job elements for a new print job ticket that is associated with a particular customer.

9. The system as recited in claim 6, wherein a choice of the normal mode or the schedule mode is manually selected from the printer.

10. The system as recited in claim 6, wherein the control system automatically monitors network bandwidth available to the printer, and wherein the control system automatically selects the normal mode if the bandwidth is sufficient to download the new print job elements and automatically selects the schedule mode if the bandwidth is insufficient to download the new print job elements.

11. The system as recited in claim 1, wherein the corresponding amounts of time are different for different ones of the prior print job elements.

12. The system as recited in claim 1, wherein the corresponding amounts of time are different for different ones of the previous print job tickets.

13. A printer, comprising:
   a control system;
   a local memory local to the control system containing one or more prior print job elements, each prior print job element retained in the local memory for a prespecified amount of time individually associated with the prior print job element; and
   a print unit configured to print a document specified by a print job ticket, the print job ticket referencing one or more new print job elements,
   wherein when the printer receives the print job ticket, the control system is configured to process the received print job ticket so as to (i) search the local memory for any of the prior print job elements that are identical to the one or more new print job elements; (ii) collect any of the new print job elements that are not stored in the local memory from at least one remote site, the remote site responsive to a download request from the control system; and (iii) store any of the new print job elements retrieved from the at least one remote site in the local memory after the print job ticket is processed by the printer.

14. The printer as recited in claim 13, wherein the print job ticket is a Job Definition Format (JDF) ticket.

15. The printer as recited in claim 13, wherein the control system is further configured to perform a checksum on any one of the prior print job elements located from the local memory that are identical to any one of the new print job elements referenced by the print job ticket.

16. One or more computer-readable media encoded with a computer program having processor executable instructions that, when executed by a processor of a printer, direct the printer:
   receive a print job ticket referencing one or more print job elements;
   search a local memory within the printer for any prestored print job elements identical to the one or more print job elements referenced by the print job ticket to ascertain whether any of the one or more print job elements are already present in the local memory, wherein each of the prestored print job elements is retained in the memory for a prespecified amount of time individually associated with the prior print job element;
   download the one or more print job elements not found in the local memory from at least one remote site, the remote site responsive to a download request from the host device; and
   initiate printing of the one or more print job elements on a print unit.

17. The computer-readable media as recited in claim 16, further comprising processor executable instructions, that, when executed, direct the printer to retain at least some of the one or more print job elements referenced by the print job ticket in the local memory for a corresponding amount of time specified by the print job ticket after completion of the print job ticket for later retrieval, in the event a future print job ticket references any of the one or more print job elements retained in the local memory.

18. The computer-readable media as recited in claim 17, wherein the corresponding amount of time for a first one of the prestored print job elements is different from the corresponding amount of time for a second one of the prestored print job elements.

19. One or more computer-readable media encoded with a computer program having processor executable instructions that, when executed by a processor of a printer, direct the printer to:
   (a) receive a print job ticket referencing one or more print job elements to be printed on a print unit of the printer;
   (b) search a local memory in the printer for any prestored print job elements that match the one or more print job elements referenced by the print job ticket, wherein each of the prestored print job elements is retained in the local memory for a prespecified amount of time that is individually associated with the prior print job element by a prior print job ticket;
   (c) download any of the one or more print job elements referenced by the print job ticket not matching the one or more print job elements in local memory from at least one remote site, the remote site responsive to a download request from the host device;
   (d) retain any of the one or more print job elements retrieved from the at least one remote site in the local memory for a corresponding amount of time specified by the print job ticket after the print job ticket is processed by the printer; and
   (e) initiate printing of the print job ticket on the print unit.

20. The computer-readable media as recited in claim 19, further comprising processor executable instructions, that, when executed, direct the printer to perform a checksum on any one of the print job elements located from the local memory that are identical to any one of the one or more print job elements referenced by the print job ticket.

* * * * *

UNITED STATES PATENT AND TRADEMARK OFFICE
CERTIFICATE OF CORRECTION

PATENT NO.          : 7,265,866 B2                                         Page 1 of 1
APPLICATION NO.  : 10/211911
DATED                   : September 4, 2007
INVENTOR(S)         : Stanley Bruce Holmstead et al.

It is certified that error appears in the above-identified patent and that said Letters Patent is hereby corrected as shown below:

In column 10, line 50, in Claim 6, after "on-demand" insert -- , --.

In column 11, line 41, in Claim 16, delete "printer:" and insert -- printer to: --, therefor.

Signed and Sealed this

First Day of July, 2008

JON W. DUDAS
*Director of the United States Patent and Trademark Office*